US010202890B2

(12) United States Patent
Koguchi et al.

(10) Patent No.: US 10,202,890 B2
(45) Date of Patent: Feb. 12, 2019

(54) STRUCTURE FOR REDUCING AMOUNT OF WATER SPLASHED ON VEHICLE ENGINE

(71) Applicant: MAZDA MOTOR CORPORATION, Hiroshima (JP)

(72) Inventors: Tomohiro Koguchi, Higashihiroshima (JP); Yuichi Ayukawa, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 0 days.

(21) Appl. No.: 15/694,232

(22) Filed: Sep. 1, 2017

(65) Prior Publication Data
US 2018/0066568 A1 Mar. 8, 2018

(30) Foreign Application Priority Data

Sep. 6, 2016 (JP) .................. 2016-173656

(51) Int. Cl.
*B60K 11/04* (2006.01)
*F01P 11/04* (2006.01)
*B60K 11/02* (2006.01)
*F02B 67/00* (2006.01)
*F02B 67/06* (2006.01)

(52) U.S. Cl.
CPC .............. *F01P 11/04* (2013.01); *B60K 11/02* (2013.01); *B60K 11/04* (2013.01); *F02B 67/00* (2013.01); *B60Y 2410/114* (2013.01); *F02B 67/06* (2013.01)

(58) Field of Classification Search
CPC ......... B60K 11/00; B60K 11/02; B60K 11/04; B60K 11/08; B60K 5/04; F02B 67/06
See application file for complete search history.

(56) References Cited

U.S. PATENT DOCUMENTS

| 2,265,078 | A | * | 12/1941 | Marsh | B60K 5/04 123/41.11 |
| 4,485,882 | A | * | 12/1984 | Ide | B60K 5/04 180/297 |
| 5,230,401 | A | * | 7/1993 | Kameda | B60K 5/04 180/248 |
| 5,588,325 | A | * | 12/1996 | Green | F02B 67/06 123/198 C |
| 6,089,833 | A | * | 7/2000 | Glanfield | F01P 5/10 417/362 |

(Continued)

FOREIGN PATENT DOCUMENTS

JP  2000110564  *  4/2000
JP  2007-198139 A  8/2007

OTHER PUBLICATIONS

Translation of JP2000110564 (Year: 2000).*

*Primary Examiner* — Emma K Frick
(74) *Attorney, Agent, or Firm* — Studebaker & Brackett PC

(57) ABSTRACT

A transverse engine adjacent to a drive shaft includes an engine body having a crankshaft, a first pipe connected to the engine body and running such that an engine coolant flows therethrough, and an accessory drive system. The accessory drive system includes an endless outer belt wound between a crankshaft pulley and an alternator drive pulley. A portion of the first pipe forms a water protector located between the drive shaft and the outer belt and overlapping with the outer belt as viewed from the front or rear of the vehicle.

7 Claims, 9 Drawing Sheets

(56) References Cited

U.S. PATENT DOCUMENTS

| | | | | |
|---|---|---|---|---|
| 6,779,622 B2* | 8/2004 | Mizorogi | ............... | B60K 6/26 |
| | | | | 123/41.56 |
| 7,878,286 B2* | 2/2011 | Kobayashi | ......... | B62D 25/2045 |
| | | | | 180/296 |
| 9,022,168 B2* | 5/2015 | Hayman | ............... | B60K 5/00 |
| | | | | 180/443 |
| 2007/0213153 A1* | 9/2007 | Stone | .................. | F02B 67/06 |
| | | | | 474/133 |

* cited by examiner

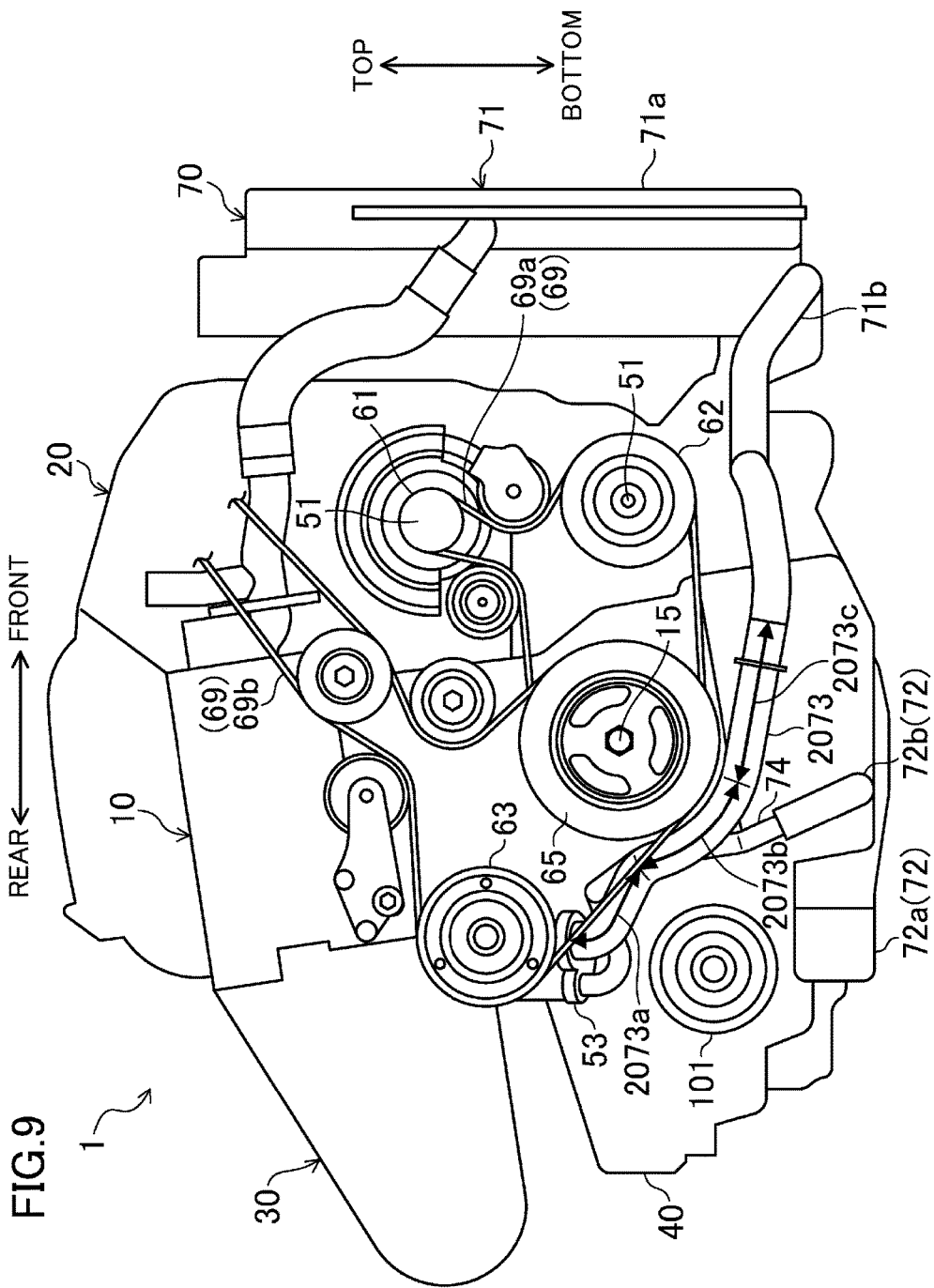

STRUCTURE FOR REDUCING AMOUNT OF WATER SPLASHED ON VEHICLE ENGINE

CROSS-REFERENCE TO RELATED APPLICATION

This application claims priority to Japanese Patent Application No. 2016-173656 filed on Sep. 6, 2016, the entire disclosure of which is hereby incorporated by reference.

BACKGROUND

The present disclosure relates to a structure for reducing the amount of water splashed on a vehicle engine.

Japanese Unexamined Patent Publication No. 2007-198139 discloses an accessory drive belt cover for an engine as an exemplary structure for reducing the amount of water splashed on a vehicle engine. Specifically, Japanese Unexamined Patent Publication No. 2007-198139 describes an accessory drive system including a crankshaft pulley, an accessory pulley, and an endless transmitting member (an accessory drive belt) wound between the pulleys. This system is installed near one end of an engine body in the direction in which its output shaft extends, and is covered with the accessory drive belt cover disposed near the one end.

SUMMARY

If a vehicle includes a so-called transverse engine including a crankshaft parallel to a drive shaft of the vehicle, its accessory drive system described above is disposed near the drive shaft. Passage of a vehicle with such a transverse engine through a puddle, for example, may cause rainwater splashed upward by driving wheels to enter an engine compartment through the drive shaft. In this case, the rainwater scattered from the drive shaft may cause the endless transmitting member to get wet. It is not recommended that the endless transmitting member get wet, because the wetness may cause the belt to slip, to make noise, or to wear out due to sand grains in the rainwater.

To address this problem, a separate cover may be attached to the accessory drive system as described in Japanese Unexamined Patent Publication No. 2007-198139 described above. However, such a configuration would cause the engine size to increase in the direction in which the output shaft extends by the size of the cover attached. This reduces the distance between the engine and the engine compartment, and in turn, may reduce the ease of maintenance, resulting in inconvenience.

If a separate cover were attached to the system, a need would arise to take ventilation of the interior of the cover into account. This may cause another inconvenience, such as complication of the engine structure.

In view of the foregoing background, it is therefore an object of the present disclosure to reduce the amount of water splashed on an endless transmitting member without attaching a separate cover to a transverse engine.

The present disclosure relates to a structure for reducing an amount of water splashed on a vehicle engine. The vehicle engine includes: an engine body mounted in a vehicle, and having an output shaft, the engine body being adjacent to a drive shaft of the vehicle, the output shaft being parallel to the drive shaft; an engine accessory disposed along an outer surface of the engine body; and an accessory drive system disposed near one end of the engine body in a direction in which the output shaft extends, and configured to drivably couple the engine body and the engine accessory together. The structure includes a coolant pipe which is connected to the engine body and through which an engine coolant flows. The accessory drive system includes: an accessory drive pulley configured to drive the engine accessory; and an endless transmitting member wound around the accessory drive pulley.

A portion of the coolant pipe forms a water protector located between the drive shaft and the endless transmitting member and overlapping with the endless transmitting member as viewed from a front or rear of the vehicle.

The "endless transmitting member" as used herein includes a so-called endless power transmission belt. This endless transmitting member may be wound between the accessory drive pulley and a crankshaft pulley (a so-called output shaft pulley) or between accessory drive pulleys, such as a pulley for driving an alternator and a pulley for driving an air compressor. The endless transmitting member does not have to be wound between two pulleys, and may be wound around three or more pulleys.

According to this configuration, the water protector is disposed between the drive shaft and the endless transmitting member, and overlaps with the endless transmitting member as viewed from either side in the longitudinal direction of the vehicle. Thus, the water protector functions as a water shield for the endless transmitting member. In other words, when water is scattered from the drive shaft, the water protector will get wet. This reduces the amount of water splashed on the endless transmitting member by the amount of water splashed on the water protector.

The water protector is configured not as a separate cover but as a portion of the coolant pipe, and is disposed between the drive shaft and the endless transmitting member. This can reduce the size of the engine in the direction in which the output shaft extends.

As can be seen, the configuration described above can reduce the amount of water splashed on the endless transmitting member without attaching a separate cover to the engine.

The accessory drive system may include an output shaft pulley disposed near one end of the output shaft and rotating integrally with the output shaft. The output shaft pulley may have a center axis parallel to a center axis of the accessory drive pulley. The endless transmitting member may be wound between the output shaft pulley and the accessory drive pulley. The output shaft pulley and the accessory drive pulley may be arranged in an up and down direction. The water protector may extend in a length direction of the endless transmitting member.

This configuration can enlarge the region where the water protector and the endless transmitting member overlap with each other. This helps reliably reduce the amount of water splashed on the endless transmitting member.

The structure may further include: an exhaust device connected to the engine body, and being closer to a rear end of the vehicle than the engine body is. A portion of the coolant pipe may form an inclined pipe portion extending downward in a height direction of the engine body and extending along a portion of the engine body close to the rear end of the vehicle. The inclined pipe portion may be inclined toward a front end of the vehicle as a point of interest moves from top to bottom of the vehicle.

The "inclined pipe portion" as used herein may be separate from, or at least partially joined to, a portion of the coolant pipe forming the water protector.

If water is scattered from the drive shaft, not only the water protector but also the entire coolant pipe may get wet.

However, if a portion of the coolant pipe and the exhaust device are relatively close to each other, such as if a portion of the coolant pipe and the exhaust device are disposed behind the engine body, water splashed on this portion of the coolant pipe may cause heat generated by the exhaust device to accelerate corrosion of the coolant pipe.

According to the configuration described above, the inclined pipe portion, which is a portion of the coolant pipe behind the engine body, is inclined toward the front end of the vehicle. Thus, the inclined pipe portion is spaced apart from the exhaust device by at least the degree to which the inclined pipe portion is inclined. This can reduce the degree to which corrosion arising from the exhaust device is accelerated.

The structure may further include: a radiator closer to a front end of the vehicle than the engine body is. The radiator may include a radiator hose connected to the coolant pipe. A junction between the coolant pipe and the radiator hose may be closer to the front end of the vehicle than the water protector is.

Generally, water tends to accumulate at the junction between the coolant pipe and the radiator hose. However, it is not recommended that water accumulate at such a place, because such water may cause corrosion of parts.

Water deposited on the water protector may move downward on the outer surface of the coolant pipe by gravitation.

According to the configuration described above, the junction between the coolant pipe and the radiator hose is located forward of the water protector. This configuration reduces the likelihood that water deposited on the water protector will reach the junction and accumulate thereat, as compared with, for example, a configuration in which such a junction is located immediately below the water protector. This helps prevent corrosion of parts.

The accessory drive system may include an output shaft pulley disposed near one end of the output shaft and rotating integrally with the output shaft. The output shaft pulley may have a center axis parallel to a center axis of the coolant pipe. The endless transmitting member may be wound between the output shaft pulley and the accessory drive pulley. The coolant pipe may include a curved pipe portion curved along an outer peripheral surface of the output shaft pulley.

The "curved pipe portion" as used herein may be separate from, or at least partially joined to, a portion of the coolant pipe forming the water protector.

According to this configuration, provision of the curved pipe portion extending along the outer peripheral surface of the output shaft pulley can substantially prevent rainwater from accumulating on a portion of the endless transmitting member wound around the output shaft pulley, and can substantially prevent sand and other grains from being caught on that portion.

The water protector may be adjacent to both of a portion of the endless transmitting member and the drive shaft.

This configuration helps more reliably reduce the amount of water splashed on the endless transmitting member.

As can be seen from the foregoing description, the structure for reducing the amount of water splashed on a vehicle engine can reduce the amount of water splashed on the endless transmitting member without attaching a separate cover to the engine.

BRIEF DESCRIPTION OF THE DRAWINGS

FIG. 9 illustrates a second variation of the first pipe.

DETAILED DESCRIPTION

Figure 1:
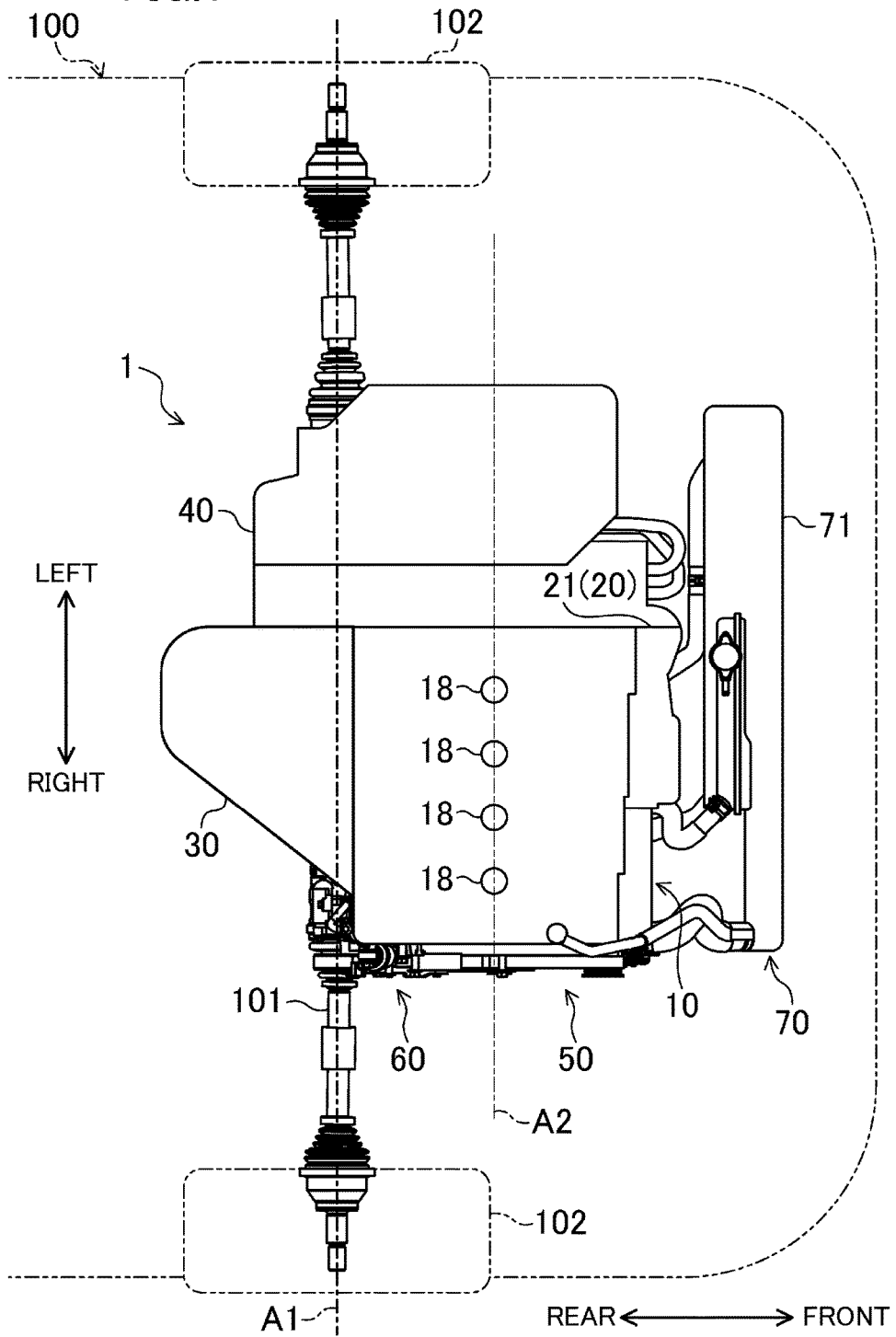
FIG. 1 is a top view illustrating a front portion of a motor vehicle with an engine including a structure for reducing the amount of water splashed on the vehicle engine.
Figure 2:
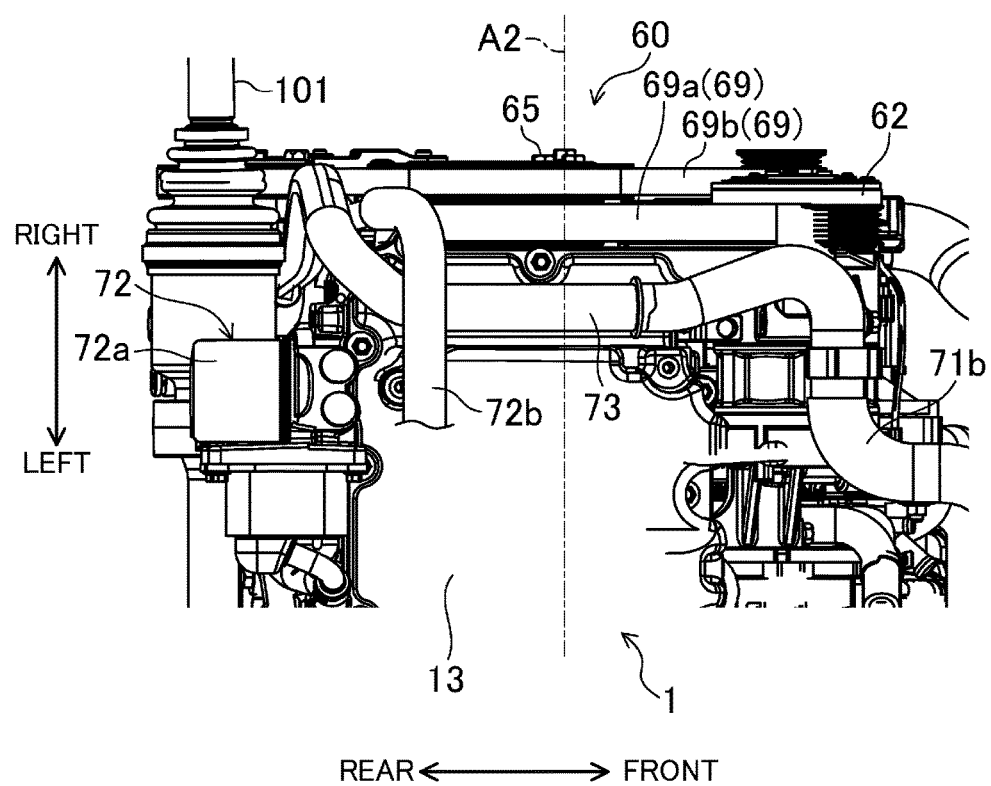
FIG. 2 illustrates a right end portion of the engine as viewed from below.
Figure 3:
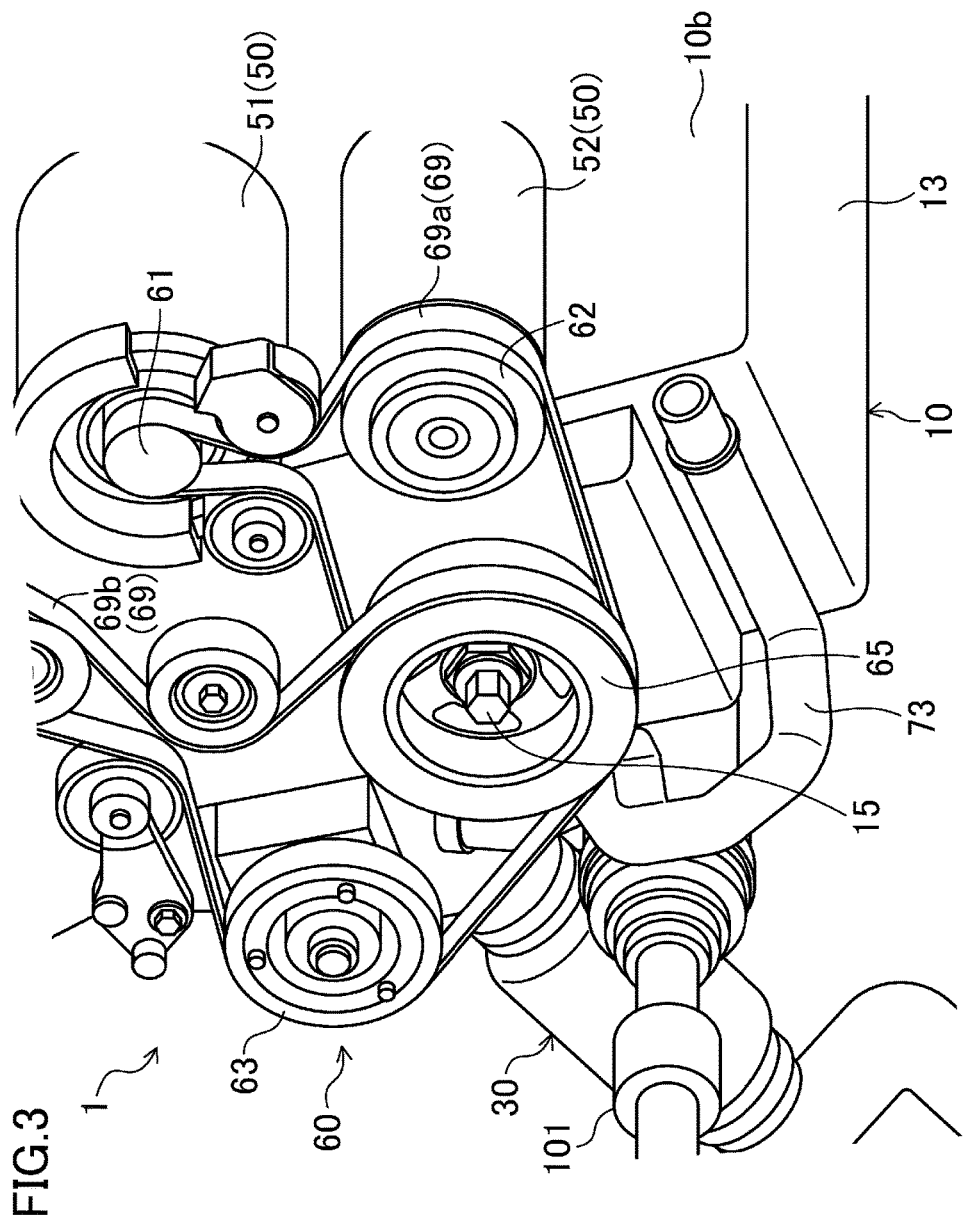
FIG. 3 is a perspective view illustrating the right end portion of the engine.
Figure 4:
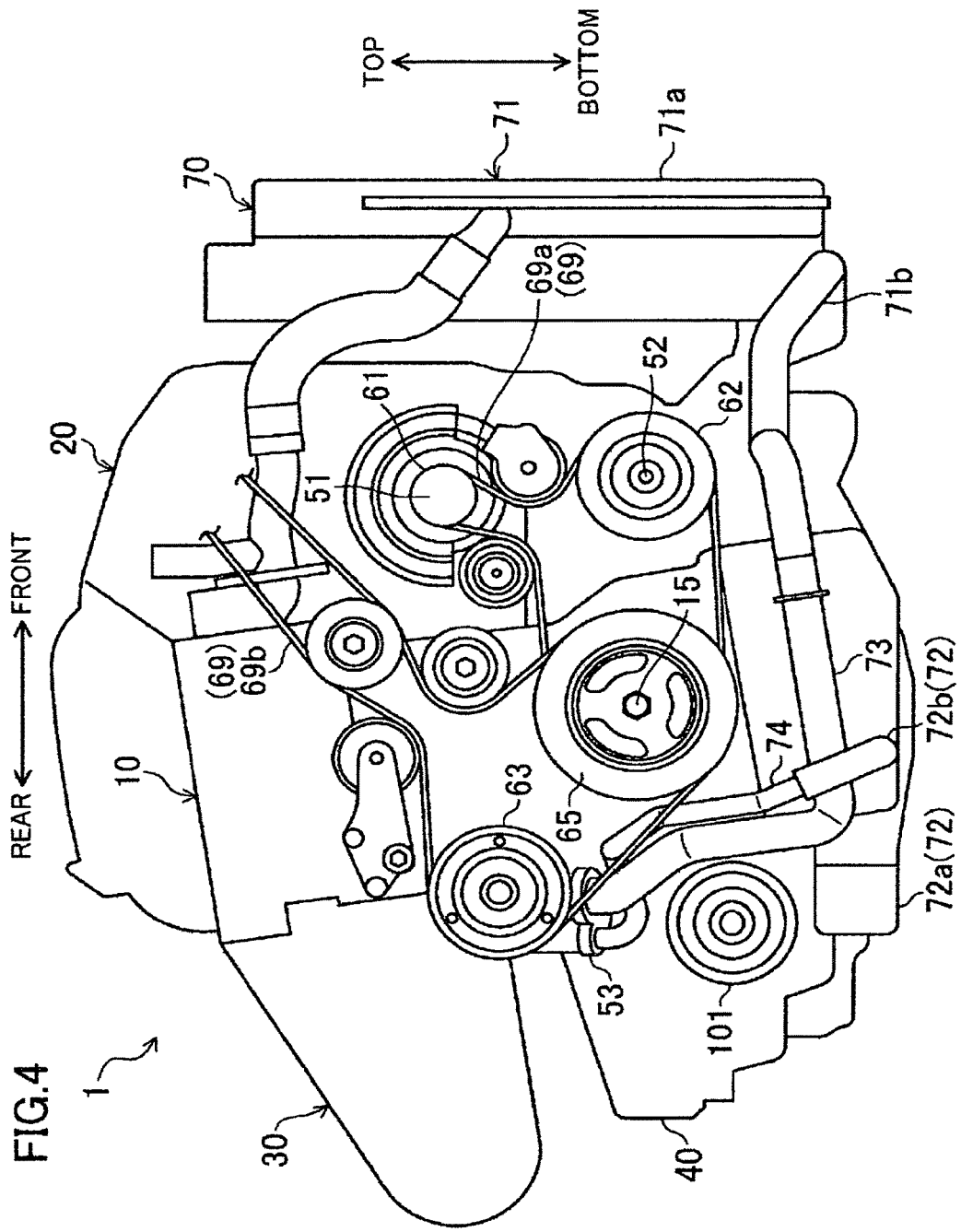
FIG. 4 is a side view illustrating the right end portion of the engine.

A structure for reducing the amount of water splashed on a vehicle engine will now be described with reference to the drawings. Note that the following description is illustrative. FIG. 1 is a top view illustrating a front portion of a motor vehicle with an engine including a structure for reducing the amount of water splashed on the vehicle engine according to the present disclosure. FIG. 2 illustrates a right end portion of the engine as viewed from below. FIG. 3 is a perspective view illustrating the right end portion of the engine. FIG. 4 is a side view illustrating the right end portion.

A motor vehicle 100 is configured as a front-engine, front-wheel-drive vehicle (a so-called FF vehicle). In other words, a drive shaft 101 that rotationally drives front wheels 102 and an engine 1 coupled to the drive shaft 101 are adjacent to each other in a front portion of the motor vehicle 100. Thus, the right side of the paper on which FIG. 1 is drawn corresponds to the front side of the motor vehicle 100.

The term "front" in the following description refers to the "front" side of the motor vehicle 100, and corresponds to the right side of the paper on which FIG. 1 is drawn. Likewise, the term "rear" refers to the "rear" side of the motor vehicle 100, and corresponds to the left side of the paper on which FIG. 1 is drawn. The term "left" refers to one side of the motor vehicle 100 in the width direction thereof, and corresponds to the upper side of the paper on which FIG. 1 is drawn. Likewise, the term "right" refers to the other side of the motor vehicle 100 in the width direction thereof, and corresponds to the lower side of the paper on which FIG. 1 is drawn. In each of the other drawings, the directions corresponding to these terms are referred to as "front," "rear," "left," and "right," respectively.

The engine 1 mounted in the motor vehicle 100 is a multi-cylinder internal combustion engine. Specifically, the engine 1 disclosed herein is an inline-four gasoline engine. However, the engine 1 should not be limited to a gasoline engine. A structure for reducing the amount of water splashed on an engine, indicated below, may be used in a so-called diesel engine.

The engine 1 is "transversely" mounted such that the direction A2 in which the four cylinders are arranged (identical to the direction in which the major axis of the crankshaft extends, i.e., the direction in which an output shaft extends) substantially coincides with the vehicle width direction A1 (identical to the direction in which the center axis of the drive shaft 101 extends), and is configured as a so-called front intake and rear exhaust engine. That is to say, the engine 1 includes an engine body 10 with a crankshaft (output shaft) 15, an air intake device 20 connected to a front portion of the engine body 10, and an exhaust device 30 connected to a rear portion of the engine body 10. The engine 1 is mounted such that the crankshaft 15 is parallel to the drive shaft 101.

The engine 1 further includes a transmission 40, a plurality of engine accessories 50, an accessory drive system 60, and a cooling system 70. The transmission 40 is disposed near one end (the left end) of the engine body 10 in the direction in which the crankshaft extends, and is configured to drivably couple the engine body 10 and the drive shaft 101 together. The engine accessories 50 are arranged along an outer surface of the engine body 10. The accessory drive system 60 is disposed near the other end (the right end) of the engine body 10 in the direction in which the crankshaft extends, and is configured to drivably couple the engine body 10 and the engine accessories 50 together. The cooling system 70 cools parts of the engine 1.

Specifically, the air intake device 20 allows intake air (fresh air) introduced from outside thereinto to pass therethrough, and supplies the air into cylinders (see FIG. 1) 18 of the engine body 10. To be specific, the air intake device 20 includes an intake manifold 21 serving as a portion of an intake pipe. The intake manifold 21 is connected to the cylinders 18 through intake ports of the engine body 10.

The engine body 10 is configured to combust, in the cylinders 18, an air-fuel mixture of fuel and intake air supplied from the air intake device 20. Specifically, the engine body 10 includes an oil pan 13, a cylinder block assembled onto the oil pan 13, and a cylinder head assembled onto the cylinder block and forming the cylinders 18 together with the cylinder block. The oil pan 13, the cylinder block, and the cylinder head are arranged in this order from bottom to top in a vertical direction. Power generated by combusting the air-fuel mixture is delivered to the outside through the crankshaft 15 provided in the cylinder block.

The crankshaft 15 is coupled to the drive shaft 101 through the transmission 40. The drive shaft 101 transmits power, delivered from the engine body 10, to the front wheels 102. As already described, the drive shaft 101 is adjacent to the engine 1. Specifically, the drive shaft 101 is disposed behind the engine body 10 and below the exhaust device 30 (see FIG. 4).

More specifically, a right end portion of the crankshaft 15 protrudes beyond a right side surface 10a of the engine body 10 as shown in FIG. 3, for example. A crankshaft pulley (output shaft pulley) 65 configured to rotate integrally with the crankshaft 15 is attached to the right end portion. The crankshaft pulley 65 has a disk shape, which is perpendicular to the direction in which the crankshaft extends, and has an outer peripheral surface around which a plurality of power transmission belts (endless transmitting members) 69 are wound. The power transmission belts 69 all have an endless belt shape, and are disposed to the right of the engine body 10 to each extend in a loop along the right side surface 10a of the engine body 10. In this embodiment, examples of the power transmission belts 69 include an inner belt 69a wound near the right side surface 10a of the engine body 10, and an outer belt 69b wound at a location closer to the outside than the location at which the inner belt 69a is wound is (on the right side of the inner belt 69a).

The exhaust device 30 is configured to discharge exhaust produced by combusting the air-fuel mixture to the outside of the engine body 10. Specifically, although not shown in detail, the exhaust device 30 includes an exhaust manifold serving as a portion of the exhaust pipe, an exhaust purifier disposed downstream of the exhaust manifold, and an insulator housing the exhaust manifold and the exhaust purifier.

The exhaust manifold is connected to the cylinders 18 through exhaust ports of the engine body 10.

The transmission 40 is disposed near one end (the left end) of the engine body 10 in the direction in which the crankshaft extends, and is configured to transmit power fed from the crankshaft 15 and to output the transmitted power to the drive shaft 101.

The engine accessories 50 include an alternator 51 and an air compressor 52 disposed along a front surface (outer surface on the intake side) 10b of the engine body 10, and a water pump 53 disposed along a rear surface (outer surface on the exhaust side) 10c of the engine body 10.

Specifically, the alternator 51 generating alternating current for use in an electrical system and the air compressor 52 for air conditioning are arranged near the right end of the front surface 10b of the engine body 10 in this order from top to bottom. As shown in FIGS. 3-4, an alternator drive pulley 61 is attached to a right end portion of the alternator 51. The alternator drive pulley 61 has a disk shape having a center axis extending in a direction parallel to the direction in which the center axis of the crankshaft pulley 65 extends, and is configured to drive the alternator 51. Likewise, an air compressor drive pulley 62 is attached also to a right end portion of the air compressor 52. The air compressor drive pulley 62 has a disk shape having a center axis extending in the direction parallel to the direction in which the center axis of the crankshaft pulley 65 extends, and is configured to drive the air compressor 52. The above-described inner belt 69a is wound around the outer peripheral surface of the alternator drive pulley 61 and the outer peripheral surface of the air compressor drive pulley 62 (see FIGS. 3-4). The alternator drive pulley 61 and the air compressor drive pulley 62 are exemplary "accessory drive pulleys."

Meanwhile, the water pump 53 is disposed near the right end of the rear surface 10c of the engine body 10. The water pump 53 forms part of the cooling system 70 described below, and functions as a pump to circulate an engine coolant through the system 70. A water pump drive pulley 63 is attached also to a right end portion of the water pump 53. The water pump drive pulley 63 has a disk shape having a center axis extending in the direction parallel to the direction in which the center axis of the crankshaft pulley 65 extends, and is configured to drive the water pump 53. The water pump drive pulley 63 is located outward (rightward) of the alternator drive pulley 61 and the air compressor drive pulley 62, and has an outer peripheral surface around which the above-described outer belt 69b is wound. The water pump drive pulley 63 is also an exemplary "accessory drive pulley."

Note that the crankshaft pulley 65 and the water pump drive pulley 63 are arranged in an up and down direction. Specifically, the crankshaft pulley 65 is arranged below the water pump drive pulley 63. Such arrangement allows the length direction of the outer belt 69b to be generally parallel to the direction from top to bottom of the engine body 10.

The accessory drive system 60 is disposed near the right end of the engine body 10, and includes the crankshaft pulley 65, the alternator drive pulley 61, the air compressor drive pulley 62, the water pump drive pulley 63, a plurality of driven pulleys (omitted for further information), an automatic tensioner (omitted for further information), the inner belt 69a, and the outer belt 69b. That is to say, operation of the engine body 10 allows the crankshaft pulley 65 to be rotationally driven through the crankshaft 15. Rotation of the crankshaft pulley 65 allows its power to be transmitted through the inner belt 69a to the alternator drive pulley 61 and the air compressor drive pulley 62, or to be transmitted through the outer belt 69b to the water pump drive pulley 63. Power transmitted to each of the pulleys is used to drive an associated one of the accessories. In other words, the alternator drive pulley 61 rotates under the transmitted power, and actuates the alternator 51. Likewise, while the air compressor drive pulley 62 actuates the air compressor 52, the water pump drive pulley 63 actuates the water pump 53.

The cooling system 70 includes a radiator 71, an oil cooler 72, the water pump 53, a thermostat (not shown), and a water jacket (not shown). The cooling system 70 circulates an engine coolant among the components of the system 70 by controlling operation of the water pump 53.

The radiator 71 includes a generally thin-plate-like radiator body 71a disposed in front of the engine body 10, and a radiator hose 71b guiding a coolant that has flowed out of the radiator body 71a. The radiator body 71a is configured to exchange heat between an engine coolant and outside air.

The oil cooler 72 is disposed behind the oil pan 13 to cool engine oil. Specifically, the oil cooler 72 includes a cooler body 72a exchanging heat between an engine coolant and engine oil, and a cooler hose 72b through which the engine coolant that has absorbed heat in the cooler body 72a is discharged.

Generally, an engine coolant discharged from the water pump 53 passes through the engine body 10 and the radiator 71 in this order, or passes through the engine body 10 and the oil cooler 72 in this order. That is to say, a circulation path for an engine coolant branches into a channel extending through the radiator 71 and a channel extending through the oil cooler 72. These channels join in the water pump 53. That is to say, an engine coolant that has passed through the radiator 71, and an engine coolant that has passed through the oil cooler 72 gather in the water pump 53, and then the engine coolant thus gathered is again ejected toward the engine body 10.

A portion of the circulation path extending from the radiator 71 to the water pump 53 is defined by the radiator hose 71b and a first suction pipe (hereinafter referred to as a "first pipe") 73 connected to the water pump 53.

Meanwhile, a portion of the circulation path extending from the oil cooler 72 to the water pump 53 is defined by a second suction pipe (hereinafter referred to as a "second pipe") 74 connected to the water pump 53.

Figure 5:
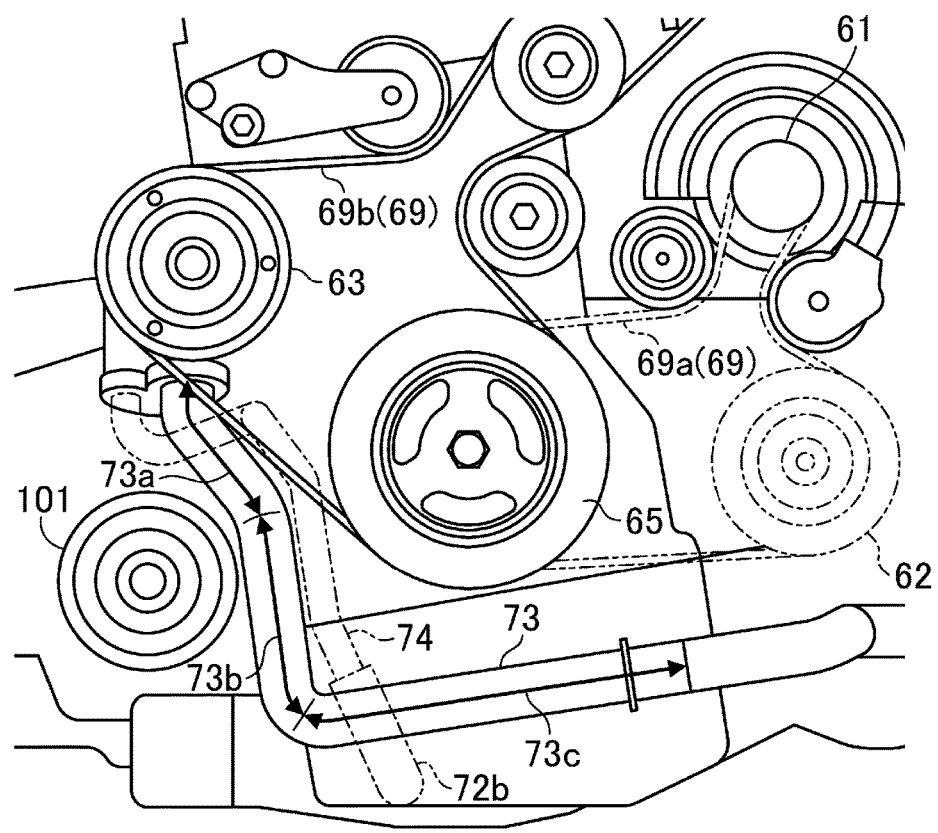
FIG. 5 illustrates the relative positions of a first pipe, an outer belt, and a drive shaft.
Figure 6:
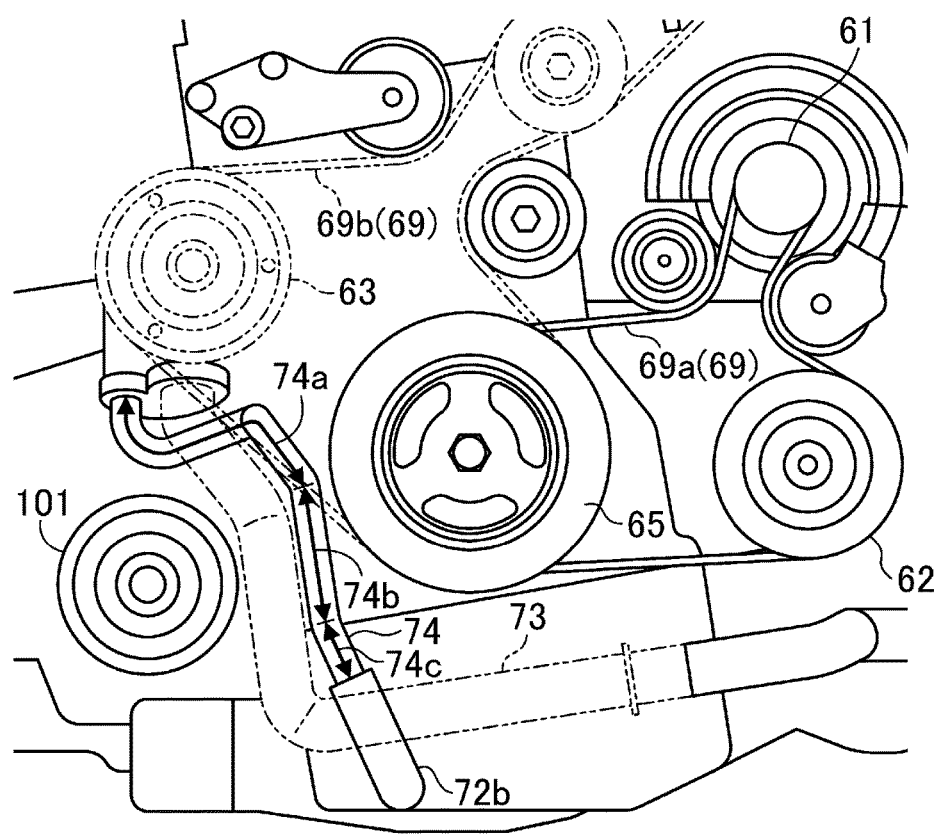
FIG. 6 illustrates the relative positions of a second pipe, an inner belt, and the drive shaft.

As shown in FIGS. 4-6, the first and second pipes 73 and 74 are both connected to the engine body 10 through the water pump 53, and run such that an engine coolant flows through these pipes. The first and second pipes 73 and 74 are exemplary "coolant pipes."

The structure of the first pipe 73 will now be described in detail in the order from the downstream end to the upstream end thereof.

The downstream end of the first pipe 73 is connected to a lower surface of the water pump 53.

As shown in FIGS. 4-6, a downstream portion 73a of the first pipe 73 including the downstream end extends downward from the engine body 10 through the water pump 53, and is disposed along a portion of the engine body 10 near the rear end of the vehicle.

The downstream portion 73a is inclined to prevent itself from coming into contact with both of the crankshaft pulley 65 and the drive shaft 101. Specifically, as shown in FIG. 5, when viewed from the right of the engine body 10, the downstream portion 73a is inclined toward the front of the vehicle (toward the intake side) as the point of interest moves from top to bottom of the vehicle. The downstream portion 73a is an exemplary "inclined pipe portion."

Figure 7:
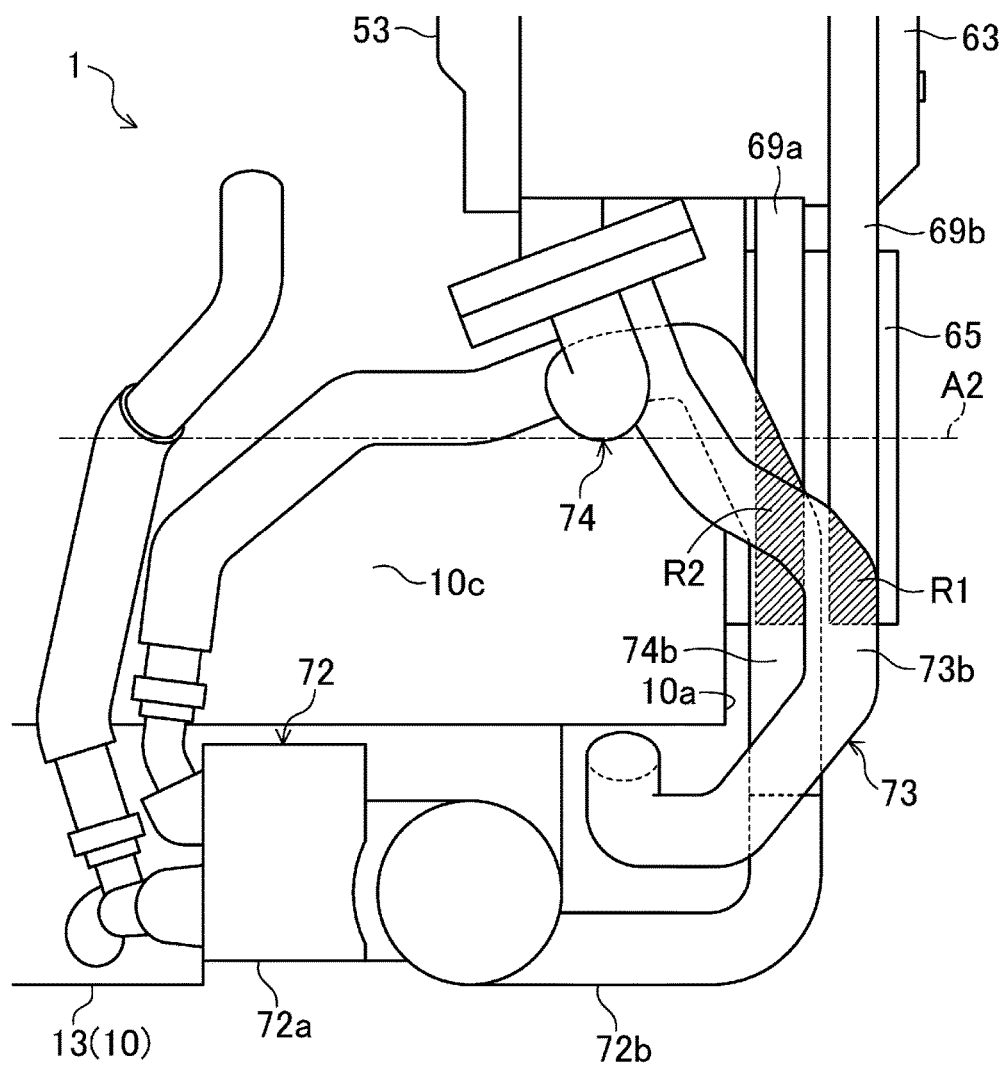
FIG. 7 illustrates the right end portion of the engine as viewed from behind.

FIG. 7 illustrates a right end portion of the engine 1 as viewed from behind. As shown in FIG. 7, when viewed from behind the vehicle, the downstream portion 73a is inclined rightward (outward of the engine body 10) as the point of interest moves from top to bottom of the vehicle (see FIG. 5).

A portion 73b of the first pipe 73 extending upstream from the lower end of the downstream portion 73a is disposed between the drive shaft 101 and the outer belt 69b as shown in FIG. 5, and runs to overlap with the outer belt 69b when viewed from the front or rear of the vehicle (in this embodiment, from the rear of the vehicle) as shown in FIG. 7. This portion (hereinafter referred to as a "first shielding portion") 73b functions as a water shield to protect the outer belt 69b from water splashed upward by the drive shaft 101. The first shielding portion 73b is an exemplary "water protector."

Specifically, the first shielding portion 73b is arranged adjacent to both of the drive shaft 101 and a portion of the outer belt 69b wound between the crankshaft pulley 65 and the water pump drive pulley 63.

As shown in FIG. 5, the first shielding portion 73b extends downward from the lower end of the downstream portion 73a as viewed from the right of the engine body 10. The first shielding portion 73b is more gently inclined toward the front end of the vehicle than the downstream portion 73a as the point of interest moves downward.

As shown in FIG. 7, the first shielding portion 73b extends parallel to the length direction of the outer belt 69b when viewed from the rear of the vehicle. As shown in the region R1 of FIG. 7, the first shielding portion 73b overlaps with the outer belt 69b when viewed from the rear of the vehicle.

As shown in FIG. 5, an upstream portion 73c of the first pipe 73 extending from the lower end of the first shielding portion 73b and including the upstream end of the first pipe 73 extends generally linearly toward the front end of the vehicle when viewed from the right of the engine body 10. A front end portion of the upstream portion 73c (an upstream end portion of the first pipe 73) is formed so as to be inserted into a tip end of the radiator hose 71b. In other words, the front end portion constitutes a connector between the first pipe 73 and the radiator hose 71b. Thus, the engine coolant cooled in the radiator 71 passes through the radiator hose 71b and the first pipe 73, so as to be delivered to the water pump 53. Note that the junction between the first pipe 73 and the radiator hose 71b is positioned forward of at least the first shielding portion 73b. Thus, the engine coolant cooled in the radiator 71 passes through the radiator hose 71b and the first pipe 73, so as to be delivered to the water pump 53.

As shown in FIGS. 4-7, when viewed from the rear of the vehicle, the upstream portion 73c extends slightly leftward (into the engine body 10) from the lower end of the first shielding portion 73b, and then extends toward the front end of the vehicle. Specifically, as shown in FIG. 2, the upstream portion 73c extends along the right side portion of the oil pan 13.

Next, the structure of the second pipe 74 will be briefly described.

Just like the first pipe 73, the downstream end of the second pipe 74 is connected to a lower surface of the water pump 53.

As shown in FIGS. 6-7, a downstream portion 74a of the second pipe 74 including the downstream end extends downward from the engine body 10 through the water pump 53, and is disposed closer to the rear end of the vehicle than the engine body 10 is.

Just like the downstream portion 73a of the first pipe 73, the downstream portion 74a is inclined to prevent itself from coming into contact with both of the crankshaft pulley 65 and the drive shaft 101. Specifically, when viewed from the right of the engine body 10, the downstream portion 74a of the second pipe 74 is substantially inclined toward the front end of the vehicle (toward the intake side) as the point of interest moves from top to bottom of the vehicle (see FIG. 6). The downstream portion 74a is also an exemplary "inclined pipe portion."

As shown in FIG. 7, when viewed from the rear of the vehicle, the downstream portion 74a extends generally rightward as the point of interest moves from top to bottom of the vehicle.

As shown in FIG. 6, a portion 74b of the second pipe 74 extending upstream from the lower end of the downstream portion 74a is disposed between the drive shaft 101 and the inner belt 69a. As shown in FIG. 7, the portion 74b runs to overlap with the inner belt 69a when viewed from the front or rear of the vehicle (in this embodiment, the rear of the vehicle). This portion (hereinafter referred to as a "second shielding portion") 74b functions as a water shield to protect the inner belt 69a from water splashed upward by the drive shaft 101. The second shielding portion 74b is also an exemplary "water protector."

Specifically, the second shielding portion 74b is arranged adjacent to both of the drive shaft 101 and a portion of the inner belt 69a wound around the crankshaft pulley 65.

As shown in FIG. 6, the second shielding portion 74b extends downward from the lower end of the downstream portion 74a when viewed from the right of the engine body 10. The second shielding portion 74b is also more gently inclined toward the front end of the vehicle than the downstream portion 74a as the point of interest moves downward.

As shown in FIG. 7, the second shielding portion 74b runs parallel to the length direction of the inner belt 69a when viewed from the rear of the vehicle. As shown in the region R2 of FIG. 7, the second shielding portion 74b overlaps with the inner belt 69a when viewed from the rear of the vehicle.

An upstream portion 74c of the second pipe 74 running from the lower end of the second shielding portion 74b and including the upstream end of the second pipe 74 extends generally downward as shown in FIG. 4 and other figures. A lower end portion of the upstream portion 74c (an upstream end portion of the second pipe 74) is inserted into the cooler hose 72b, and is connected to the cooler body 72a through the cooler hose 72b. Thus, an engine coolant that has exchanged its heat in the oil cooler 72 is delivered to the water pump 53 through the cooler hose 72b and the second pipe 74.

Passage of the motor vehicle 100 with the engine 1 according to this embodiment through a puddle, for example, may cause rainwater splashed upward by the front wheels 102 to enter a space near the engine 1 through the drive shaft 101. The drive shaft 101, which rotates at high speed, may cause rainwater to be scattered from itself. This may cause the power transmission belt 69 (e.g., the outer belt 69b) to get wet.

However, as described above, the first shielding portion 73b is disposed between the drive shaft 101 and the outer belt 69b. The first shielding portion 73b runs to overlap with the outer belt 69b when viewed from either side in the longitudinal direction of the vehicle. Thus, the first shielding portion 73b functions as a water shield for the outer belt 69b. In other words, when water is scattered from the drive shaft 101, not the outer belt 69b but the first shielding portion 73b will get wet. This can reduce the amount of water splashed on the outer belt 69b.

Likewise, the second shielding portion 74b is disposed between the drive shaft 101 and the inner belt 69a. The second shielding portion 74b runs to overlap with the inner belt 69a when viewed from either side in the longitudinal direction of the vehicle. The second shielding portion 74b also functions as a water shield for the inner belt 69a. This can reduce the amount of water splashed on the inner belt 69a.

Each of the first and second shielding portions 73b and 74b is configured not as a separate cover but as a portion of a suction pipe, and is disposed between the drive shaft 101 and an associated one of the power transmission belts 69 without protruding in the direction in which the crankshaft extends. This can reduce the size of the engine 1 in the direction in which the crankshaft extends.

As can be seen, the amount of water splashed on the power transmission belts 69 can be reduced without attaching a separate cover to the engine.

The first shielding portion 73b extends in the length direction of the outer belt 69b. The second shielding portion 74b also extends in the length direction of the inner belt 69a. This can enlarge the region where the first shielding portion 73b and the outer belt 69b overlap with each other and the region where the second shielding portion 74b and the inner belt 69a overlap with each other. This helps reliably reduce the amount of water splashed on the power transmission belts 69.

When water is scattered from the drive shaft 101, not only the first shielding portion 73b but also the entire first pipe 73 may get wet. However, if the downstream portion 73a and the exhaust device 30 are relatively close to each other, such as if the downstream portion 73a and the exhaust device 30 are disposed behind the engine body 10, water splashed on the downstream portion 73a may cause heat generated by the exhaust device 30 to accelerate corrosion of the downstream portion 73a.

However, since the downstream portion 73a is inclined toward the front end of the vehicle as described above, the downstream portion 73a is spaced apart from the exhaust device 30 by at least the degree to which the downstream portion 73a is inclined. This can reduce the degree to which corrosion arising from the exhaust device 30 is accelerated.

Generally, water tends to accumulate at the junction between the suction pipe and the radiator hose 71b. However, it is not recommended that water accumulate at such a place, because such water may cause corrosion of parts.

Meanwhile, if water is splashed on the first shielding portion 73b, the water may move downward on the outer surface of the first pipe 73 by gravitation.

As described above, the connector between the first pipe 73 and the radiator hose 71b, i.e., the front end portion of the upstream portion 73c (the upstream end portion of the first pipe 73), is disposed forward of the first shielding portion 73b. This configuration reduces the likelihood that water deposited on the first shielding portion 73b will reach the junction between the first pipe 73 and the radiator hose 71b and accumulate thereat, as compared with, for example, a configuration in which such a connector is located immediately below the first shielding portion 73b. This helps prevent corrosion of parts.

Other Embodiments

In the foregoing embodiment, a motor vehicle configured as a FF vehicle has been described as an example. However, this configuration is merely an example of the present disclosure. The structure for reducing the amount of water splashed on a vehicle engine according to the present disclosure may be used for an MR vehicle and a 4 WD vehicle, for example.

In the foregoing embodiment, the power transmission belts 69 wound between the output shaft pulley and the accessory drive pulleys have been described as exemplary endless transmitting members related to the configuration of the water protector. However, this is merely an example of the present disclosure. The endless transmitting member related to the configuration of the water protector may be wound between accessory drive pulleys without being wound around an output shaft pulley.

In the foregoing embodiment, an example in which each of the first and second pipes 73 and 74 has a structure for reducing the amount of water splashed on a vehicle engine has been described. However, this configuration is merely an example of the present disclosure. Either one of the first and second pipes 73 and 74 may have such a structure.

The configuration of the first pipe 73 should not be limited to the configuration described above.

Figure 8:
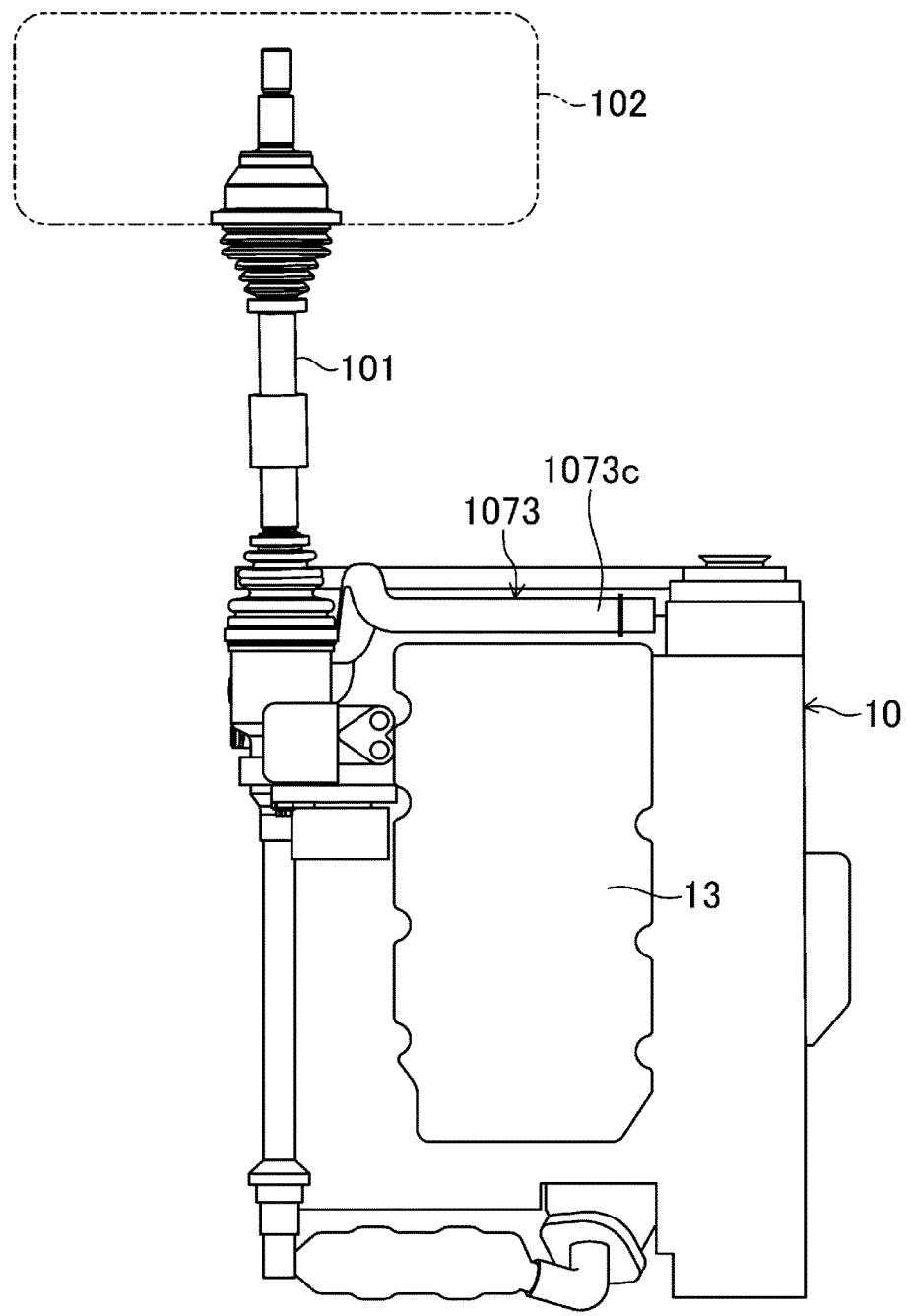
FIG. 8 illustrates a first variation of the first pipe.

FIG. 8 shows a first variation of a first pipe, which will be hereinafter denoted by reference numeral 1073.

In the foregoing embodiment, the upstream portion 73c of the first pipe 73 extends along the right side portion of the oil pan 13. However, this extension causes a fastening line along which the oil pan 13 is fastened to the engine to overlap with the first pipe 73. Thus, the need arises to remove the first pipe 73 when the oil pan 13 is to be removed. This requires time and effort, and causes inconvenience.

To avoid this inconvenience, an upstream portion 1073c of the first pipe 1073 according to the first variation is designed to be located outward (rightward) of the oil pan 13. This substantially prevents the fastening line from overlapping with the first pipe 1073 when the oil pan 13 is to be removed.

FIG. 9 shows a second variation of a first pipe, which will be hereinafter denoted by reference numeral 2073.

As in the foregoing embodiment, the first pipe 2073 according to the second variation includes a first shielding portion 2073b functioning as a water shield for the outer belt 69b.

The first shielding portion 2073b is configured as a curved pipe portion which is curved along the outer peripheral surface of the crankshaft pulley 65.

Provision of the curved pipe portion extending along the outer peripheral surface of the crankshaft pulley 65 as described above can substantially prevent rainwater from accumulating on a portion of the outer belt 69b wound around the crankshaft pulley 65, and can substantially prevent sand and other grains from being caught on that portion.

Examples of components configured as the curved pipe portion include not only the first shielding portion 2073b but also other components. For example, a portion of the first pipe 2073 corresponding to the upstream portion 73c of the foregoing embodiment (hereinafter denoted by reference character 2073c) may be curved, or a portion thereof corresponding to the downstream portion 73a of the foregoing embodiment (hereinafter denoted by reference character 2073a) may be curved.

What is claimed is:

1. A structure of a vehicle having an engine comprising: an engine body mounted on a vehicle having an output shaft, an engine accessory, an accessory drive system, a coolant pipe, an accessory drive pulley, and an endless transmitting member;
the engine body being adjacent to a drive shaft of the vehicle;
the output shaft being parallel to the drive shaft;
the engine accessory disposed along an outer surface of the engine body;
the accessory drive system disposed near one end of the engine body in a direction in which the output shaft extends, and configured to drivably couple the engine body and the engine accessory together; and
the coolant pipe which is connected to the engine body and through which an engine coolant flows, wherein
the accessory drive system includes:
the accessory drive pulley configured to drive the engine accessory; and
the endless transmitting member at least partially wound around the accessory drive pulley, and
a portion of the coolant pipe being located between the drive shaft and the endless transmitting member in a front-rear and top-bottom direction of the engine body, and overlapping with the endless transmitting member as viewed from a front or rear of the vehicle.

2. The structure of claim 1, wherein
the accessory drive system includes an output shaft pulley disposed near one end of the output shaft and rotating integrally with the output shaft,
the output shaft pulley has a center axis parallel to a center axis of the accessory drive pulley, the endless transmitting member is wound between the output shaft pulley and the accessory drive pulley,
the output shaft pulley and the accessory drive pulley are arranged in an up and down direction, and
the portion of the coolant pipe extends in a length direction of the endless transmitting member.

3. The structure of claim 1, further comprising:
an exhaust device connected to the engine body, and being closer to a rear end of the vehicle than the engine body is, wherein
the portion of the coolant pipe forms an inclined pipe portion extending downward in a height direction of the engine body and extending along a rear side of the engine body, and
the inclined pipe portion is inclined toward a front end of the vehicle as a point of interest moves from top to bottom of the vehicle.

4. The structure of claim 1, further comprising:
a radiator closer to a front end of the vehicle than the engine body is, wherein
the radiator includes a radiator hose connected to the coolant pipe, and
a junction between the coolant pipe and the radiator hose is closer to the front end of the vehicle than the water protector is.

5. The structure of claim 1, wherein
the accessory drive system includes an output shaft pulley disposed near one end of the output shaft and rotating integrally with the output shaft,
the output shaft pulley has a center axis parallel to a center axis of the accessory drive pulley,
the endless transmitting member is wound between the output shaft pulley and the accessory drive pulley, and
the portion of the coolant pipe forms a curved pipe portion curved along an outer peripheral surface of the output shaft pulley.

6. The structure of claim 1, wherein
the water protector is adjacent to both of a portion of the endless transmitting member and the drive shaft.

7. The structure of claim 1, wherein
the accessory drive system includes an output shaft pulley disposed near one end of the output shaft and rotating integrally with the output shaft,
the output shaft pulley has a center axis parallel to a center axis of the accessory drive pulley,
the endless transmitting member is wound between the output shaft pulley and the accessory drive pulley, and
in view of the one end of the output shaft extending direction, the portion of the coolant pipe is positioned between the output shaft pulley and the drive shaft, the portion of the coolant pipe forms a curved pipe portion curved along at least a part of an outer peripheral surface of the output shaft pulley, the pipe curved portion is the portion of the coolant pipe that is closest to the output shaft pulley.

* * * * *